United States Patent
Xu et al.

(10) Patent No.: US 12,366,247 B2
(45) Date of Patent: Jul. 22, 2025

(54) CLUB-SHAPED LIQUID PUMP

(71) Applicants: HDU-TIANTAI DIGITAL INDUSTRY RESEARCH INSTITUTE HANGZHOU DIANZI UNIVERSITY, Taizhou (CN); CHINA JILIANG UNIVERSITY, Hangzhou (CN)

(72) Inventors: Jing Xu, Taizhou (CN); Jiadi Lian, Hangzhou (CN)

(73) Assignees: HDU-TIANTAI DIGITAL INDUSTRY RESEARCH INSTITUTE HANGZHOU DIANZI UNIVERSITY, Taizhou (CN); CHINA JILIANG UNIVERSITY, Hangzhou (CN)

( * ) Notice: Subject to any disclaimer, the term of this patent is extended or adjusted under 35 U.S.C. 154(b) by 0 days.

(21) Appl. No.: 18/757,989

(22) Filed: Jun. 28, 2024

(65) Prior Publication Data
US 2025/0188926 A1    Jun. 12, 2025

(30) Foreign Application Priority Data
Dec. 7, 2023 (CN) .......................... 202311676932.3

(51) Int. Cl.
*F04C 15/06* (2006.01)
*F04C 15/00* (2006.01)
*F16M 13/02* (2006.01)

(52) U.S. Cl.
CPC .......... *F04C 15/06* (2013.01); *F04C 15/0057* (2013.01); *F16M 13/02* (2013.01); *F04C 2240/60* (2013.01)

(58) Field of Classification Search
CPC .. F04C 15/06; F04C 15/0057; F04C 2240/60; F16M 13/02
See application file for complete search history.

(56) References Cited

U.S. PATENT DOCUMENTS

| | | | | |
|---|---|---|---|---|
| 5,122,039 A | * | 6/1992 | Tuckey | F04C 2/102 417/543 |
| 5,248,223 A | * | 9/1993 | Hill | F04D 29/445 415/173.1 |
| 5,997,262 A | * | 12/1999 | Finkbeiner | F04C 15/06 418/166 |
| 8,291,574 B2 | * | 10/2012 | Achor | F02M 37/08 29/598 |

* cited by examiner

*Primary Examiner* — Shafiq Mian
(74) *Attorney, Agent, or Firm* — Daniel M. Cohn

(57) ABSTRACT

A club-shaped liquid pump includes a motor, an inlet end cover and an outlet end cover. Both the inlet end cover and the outlet end cover are connected to the motor, a bracket is connected to a side of the motor near the outlet end cover, the bracket is arranged with an inlet hole to suck liquid into a stator. The bracket is fixedly arranged with a pump cover plate through the stator, the pump cover plate defines an outputting channel, the pump cover plate is connected to a rotor through an eccentric connection shaft, the rotor is connected to a motor shaft. The rotor is connected to the bracket via a pushing mechanism and at least two support mechanisms and rotates eccentrically along the inside of the stator, and at least one continuously-varying compression chamber is formed between the rotor and the stator.

10 Claims, 6 Drawing Sheets

CLUB-SHAPED LIQUID PUMP

TECHNICAL FIELD

The present disclosure relates to the field of liquid pumps, and in particular to a club-shaped liquid pump.

BACKGROUND

In the field of transferring refrigerant, a volumetric pump, a rotor pump or a centrifugal pump may be arranged to transfer the refrigerant. When these conventional pumps are in operation, a motion component may be worn and torn, and therefore, metal powder on a surface of the motion component may fall off, resulting in the motor being burnt out. In addition, a lubricant needs to be applied to these conventional pumps when being in operation.

A computer server, a network device, and other devices in a data center may generate heat when operating. The heat needs to be removed in order to enable the data center devices to operate properly. Performance of the data center is affected by a temperature during operation. If the components are not sufficiently cooled, an operating efficiency of the components may be affected. The data center may often be organized into rows of racks that include electronic devices that generate the heat. The heat may significantly reduce the performance of the data center. For example, a speed of processing requests may be reduced, a lot of energy may be consumed, and components may be failed prematurely.

However, in a cooling system of the data center, a medium used by a pumping device, such as lubricating oil or lubricant, may flow into the cooling system through cooling channels. Therefore, the cooling system of the data center is in an oil-free state. Internal components of the pumping device without any lubrication may be worn and torn due to frictions, affecting the operating efficiency and the service life of the cooling system.

SUMMARY OF THE DISCLOSURE

The present disclosure provides a non-leakage data center thermal management system and a cooling method. In this way, the heat of the data center may be dissipated, and a cooling medium may be sucked through a negative pressure vacuum. When a pipe is cracked, the atmospheric pressure may be applied to the cracked position, such that water does not flow out of the pipe through the crack, and therefore, the water is not leaked, the thermal management system still operates properly. Risks of the thermal management system are reduced, the service life of the cooling system is extended, replacement and maintenance costs of the pipes is reduced. The cooling method includes simple operations, such that the heat of the data center may be dissipated quickly, and leakage is prevented. Therefore, safety and reliability of the entire cooling system is improved.

The present disclosure provides following technical solutions.

The present disclosure provides a club-shaped liquid pump to solve the above technical problem. In the present disclosure, the rotor and the stator do not contact each other, a linear velocity of the rotor and the stator is significantly low. Therefore, wear and tear may not be caused. In addition, the rotor and the stator may operate in the oil-free state. Reliability of the liquid pump is improved, the service life of the liquid pump is extended, ensuring the cooling system to operate stably and reliably.

The present disclosure provides a club-shaped liquid pump, including:
a motor, arranged with a motor shaft;
an inlet end cover and an outlet end cover, wherein, the inlet end cover and the outlet end cover are both connected to the motor, the inlet end cover is arranged with an inlet tube, the outlet end cover is arranged with and an outlet tube;
a bracket, connected to a side of the motor near the outlet end cover, wherein, the bracket defines an inlet hole through which a liquid is sucked into a stator and fixedly arranged with a pump cover plate through the stator; the pump cover plate defines an outputting channel; the pump cover plate is connected to a rotor via an eccentric connection shaft; the rotor is connected to the motor shaft; the rotor is connected to the bracket via a pushing mechanism and at least two support mechanisms and is configured to rotate eccentrically along an interior of the stator; at least one continuously-varying compression chamber is defined between the rotor and the stator.

The rotor comprises a turning disk and a rotation portion, the rotation portion is club shaped and is fixed to the turning disk.

Two ends of the stator defines an inlet channel and a plurality of outlet channels, respectively; in the inlet channel, a plurality of protrusions are arranged to form a club shape; a first guiding channel is formed between two adjacent protrusions of the plurality of protrusions; the inlet channel is communicated, through the first guiding channel, with the compression chamber; the plurality of outlet channels are arranged to form the club shaped and are communicated, through a second guiding channel, with the compression chamber.

The motor is configured to drive the motor shaft to rotate to enable the liquid to enter the inlet end cover through the inlet tube and to be sucked into the compression chamber between the rotor and the stator through the inlet hole; after continuous compression, the liquid is discharged from the outlet tube arranged on the outlet end cover by flowing through the outputting channel.

According to the present disclosure, the rotor and the stator do not contact each other, a linear velocity of the rotor and the stator is significantly low. Therefore, wear and tear may not be caused. In addition, the rotor and the stator may operate in the oil-free state. Reliability of the liquid pump is improved, the service life of the liquid pump is extended, ensuring the cooling system to operate stably and reliably.

In some embodiments, the at least two support mechanisms are distributed in a ring shape between the rotor and the bracket; every two of the at least two support mechanisms are limited and supported to each other by a fixation ring.

In some embodiments, each support mechanism comprises an eccentric block, an engineering plastic ring, and an anti-rotation pin; the eccentric block is connected to an interior of an eccentric hole defined in the bracket; the engineering plastic ring is connected to an interior of a positioning hole defined in the rotor, the positioning hole is communicated with a through hole; a side of the through hole near the positioning hole has a chamfer, the anti-rotation pin is connected to the fixation ring, the anti-rotation pin is arranged with a step, the eccentric block is connected to the step, the anti-rotation pin extends through the engineering plastic ring and is connected to the through hole.

In some embodiments, the pushing mechanism comprises a piston ring, a gasket spring, and a positioning pin; the rotor defines an annular slot and a pin hole; one end of the positioning pin is connected to the pin hole, and the other end of the positioning pin is connected to the piston ring; the gasket spring is disposed between the piston ring and the annular slot; an end face of the piston ring abuts against the gasket.

In some embodiments, the turning disk defines a bearing hole; the bearing hole is connected to a support shaft through a bearing; the support shaft is eccentrically connected to the motor shaft; a block is arranged in the rotation portion; a high-pressure zone is formed at an end of the rotation portion; the eccentric connection shaft is connected to the high-pressure zone through a bearing.

In some embodiments, the rotation portion defines at least one guiding hole and at least one concave hole; the at least one guiding hole is communicated with the high-pressure zone and the annular slot; the concave hole is defined in an end of the rotation portion.

In some embodiments, each of the turning disk and the rotation portion comprises a metal body and an engineering plastic layer; a thickness of the engineering plastic layer is 2 mm to 4 mm; each of an end surface of the turning disk near the rotation portion and an outer surface of the rotation portion defines a channel; the engineering plastic layer is connected to the metal body via the channel.

In some embodiments, each of the engineering plastic ring and the engineering plastic layer is made of elastic material.

In some embodiments, an end face of the stator near the outlet channels defines a weight-reduction chamber and a sealing slot; weight-reduction holes are distributed in an annular shape; the sealing slot forms a sealing structure along the outlet channels and the end face of the compression chamber.

In some embodiments, the pump cover plate is connected to a spring cover plate; the spring cover plate defines an outputting hole communicated with the outputting channel; a shut-off valve is arranged in the outputting channel; the shut-off valve abuts against the spring cover plate by a spring.

According to the present disclosure, following technical effects can be achieved.
1. The rotor and the stator do not contact each other, and a linear velocity of the rotor and the stator is significantly low. Therefore, wear and tear may not be caused. In addition, the rotor and the stator may operate in the oil-free state. Reliability of the liquid pump is improved, the service life of the liquid pump is extended, ensuring the cooling system to operate stably and reliably.
2. The fixation ring improves stability and reliability of the mounting of the support mechanism and ensures various support mechanisms to rotate synchronously. The support mechanism improves stability of the connection between the rotor and the bracket, ensuring the rotor to stably perform the eccentric movement.
3. The annular slot enables the gasket spring to be mounted therein, preventing slippage. The positioning pin ensures the piston ring to move in the axial direction. The rotor is tensioned by the gasket spring. In this way, a friction between the rotor and the inner wall of the stator is reduced.
4. By defining the channel, the engineering plastic layer is enabled to wrap around a surface of the turning disk and the rotation portion, such that the engineering plastic layer may not easily fall off, and the service life of the rotor is extended. The metal body may be made of aluminum alloy, ensuring strength of the whole rotor. The engineering plastic ring and the engineering plastic layer may both be made of elastic material, which may be rubber, polyether ether ketone (peek), and so on. Preferably, the engineering plastic ring and the engineering plastic layer may both be made of polyether ether ketone (peek). The polyether ether ketone (peek) is not conductive and has high affinity. Even when the polyether ether ketone (peek) is worn down, debris of the polyether ether ketone (peek) may not cause damage to the motor. In addition, dry operation may be performed. In the cooling system, the refrigerant may be easily evaporate to generate a gas, and the gas may perform dry operation, such that demands of the dry operation are satisfied.
5. The shut-off valve abuts against a spring cover by the spring. The shut-off valve is pre-tightened by the spring, such that the liquid is slowly discharged through the shut-off valve.

REFERENCE NUMERALS IN THE DRAWINGS

1—outlet end cover; 101—outlet tube;
2—inlet end cover; 201—inlet tube;
3—motor;
4—base;
5—stator; 501—inlet channel; 502—outlet channel; 503—protrusion; 504—first guiding channel; 505—compression chamber; 506—tab plate; 507—second guiding channel; 508—weight-reduction chamber; 509—sealing slot;
6—rotor; 601—block; 602—rotation portion; 603—turning disk; 604—guiding hole; 605—concave hole; 606—pin hole; 607—positioning hole; 608—bearing hole; 609—through hole; 610—engineering plastic layer; 611—channel; 612—metal body;
7—pump cover plate; 701—shut-off valve; 702—outputting channel; 703—spring;
8—spring cover; 801—outputting hole;
9—eccentric connection shaft;

10—bracket; 1001—inlet hole; 1002—eccentric hole;
11—motor shaft; 12—support shaft; 13—counterweight block;
1401—eccentric block; 1402—engineering plastic ring; 1403—anti-rotation pin; 1404—fixation ring; 1405—step;
1501—piston ring; 1502—gasket spring; 1503—o-shaped ring; 1504—positioning pin.

DETAILED DESCRIPTION

To be noted that the embodiments and the features in the embodiments of the present disclosure may be combined with each other without conflict. The present disclosure will be described in detail below by referring to the accompanying drawings and the embodiments.

In order to enable any ordinary skilled person in the art to better understand the embodiments of the present disclosure, the technical solutions in the embodiments of the present disclosure will be described clearly and completely in the following by referring to the accompanying drawings. Obviously, the described embodiments are only a part of, not all of, the embodiments of the present disclosure. All other embodiments, which are obtained by any ordinary skilled person in the art based on the embodiments of the present disclosure without making creative work, shall fall within the scope of the present disclosure. To be noted that the terms "first", "second", and so on, in the specification, the claims, and the accompanying drawings of the present disclosure are used to distinguish similar objects and shall not be interpreted as describing a particular order or sequence. In addition, the terms "comprise", "have", and any variations thereof, are intended to cover non-exclusive inclusion.

Figure 1:
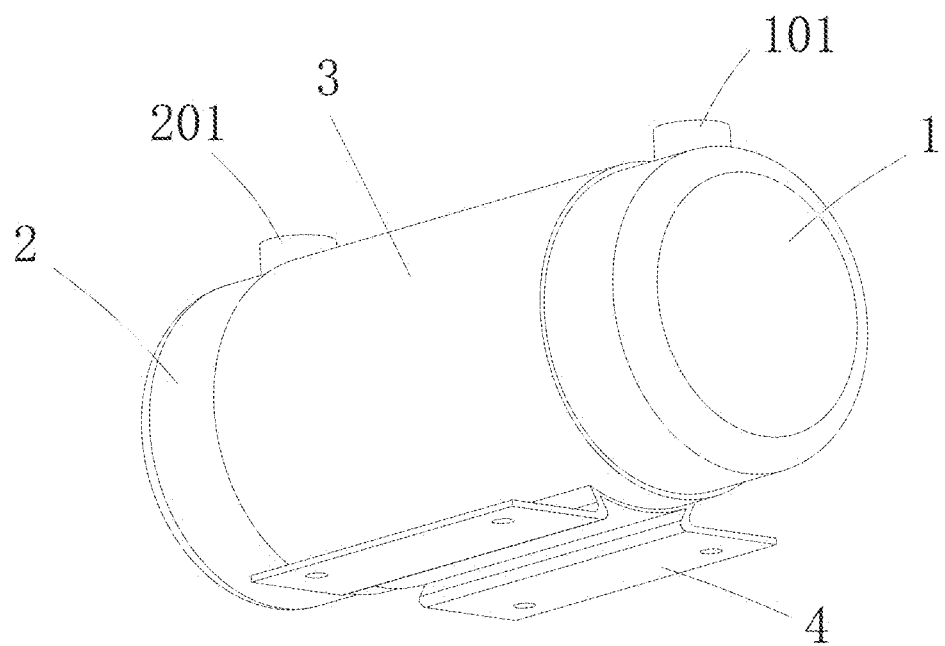
FIG. 1 is a perspective view of a club-shaped liquid pump according to an embodiment of the present disclosure.
Figure 2:
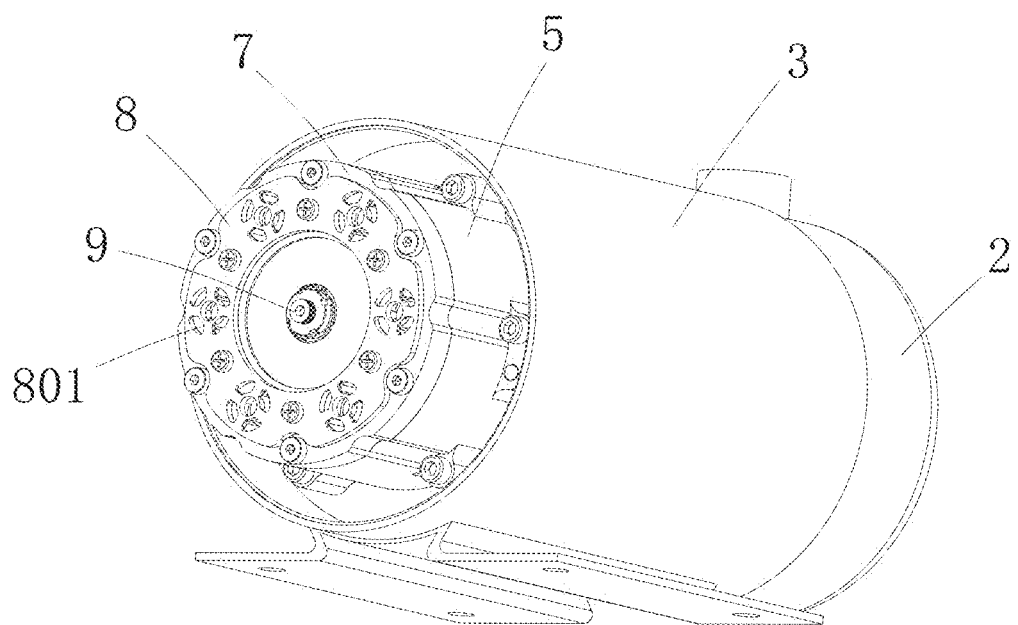
FIG. 2 is a perspective view of the club-shaped liquid pump having an outlet end cover omitted, according to an embodiment of the present disclosure.
Figure 3:
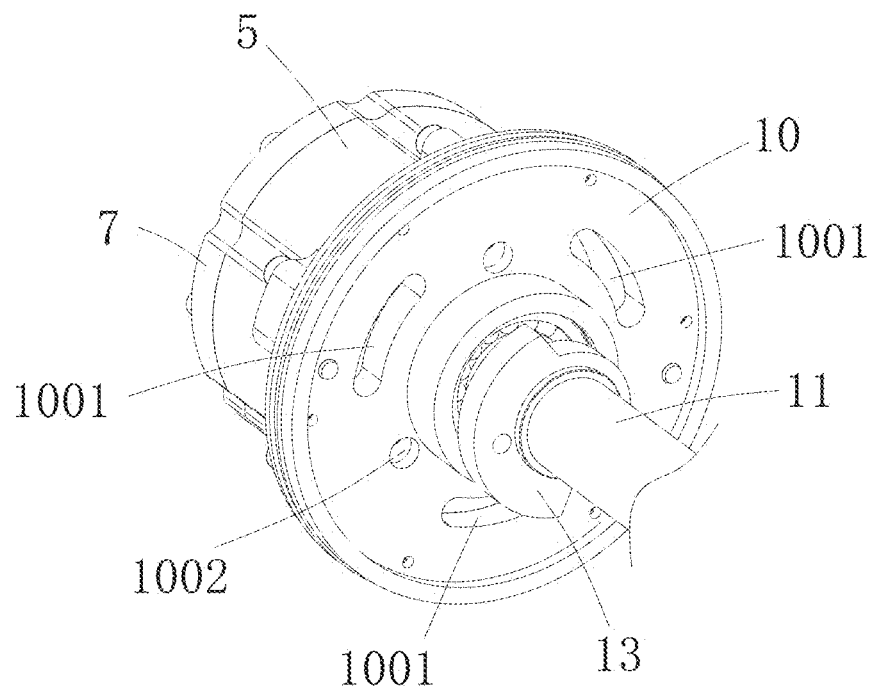
FIG. 3 is a schematic view of connection among a pump cover plate, a stator, a rotor, a bracket, and a motor shaft according to an embodiment of the present disclosure.
Figure 4:
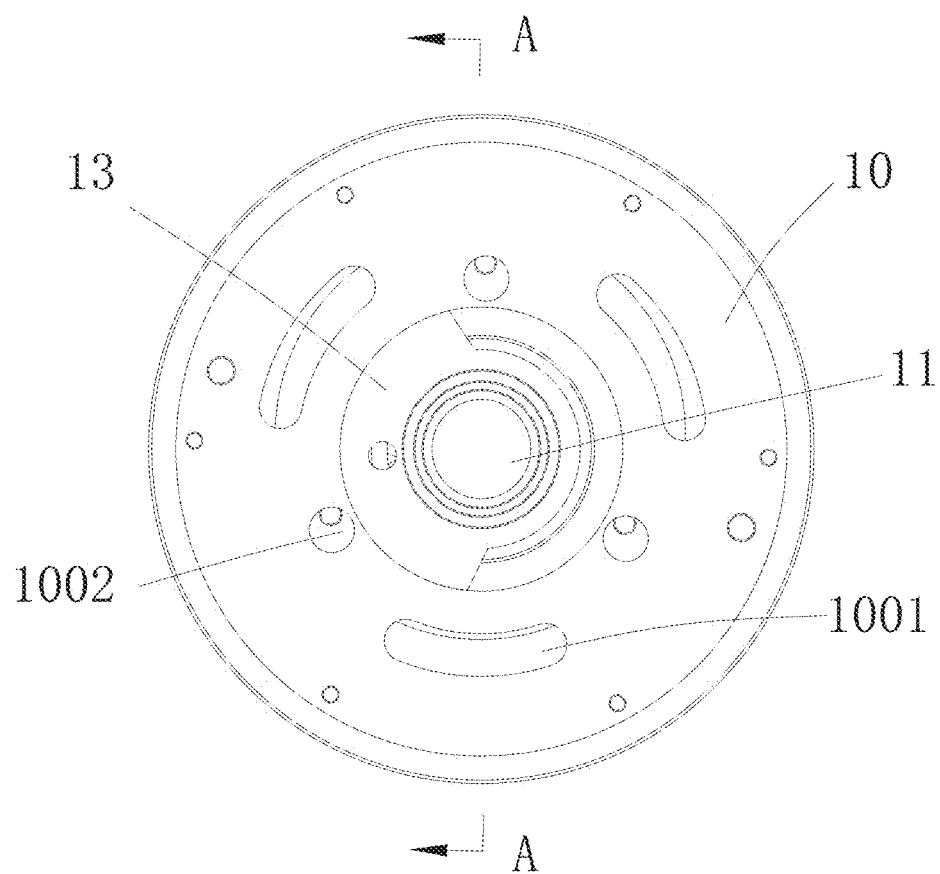
FIG. 4 is a front view of the structure shown in FIG. 3.
Figure 5:
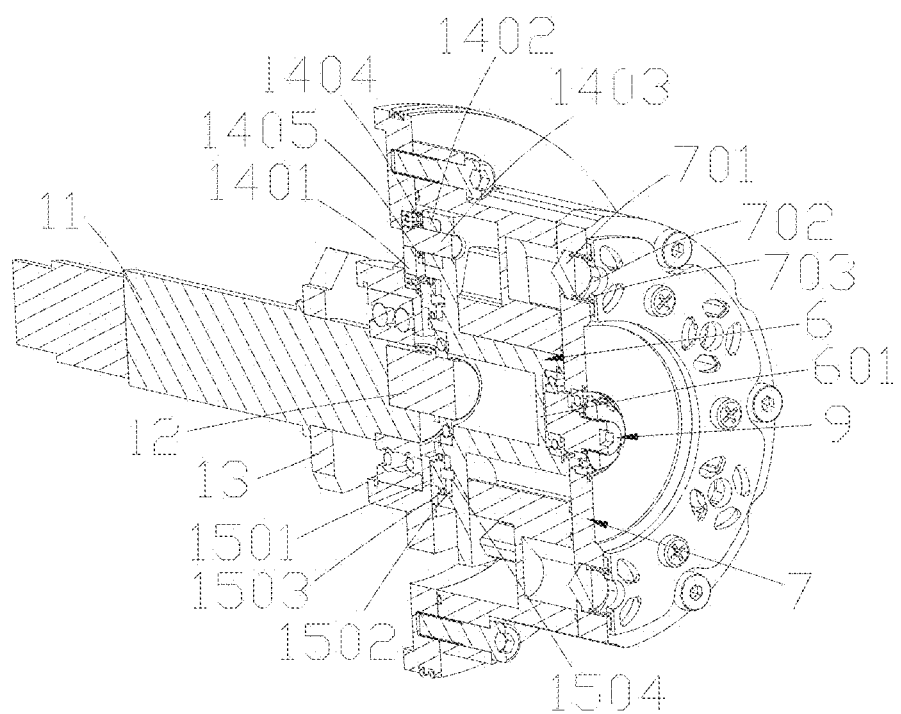
FIG. 5 is a cross-sectional view of the structure shown in FIG. 4, taken along a line A-A.
Figure 6:
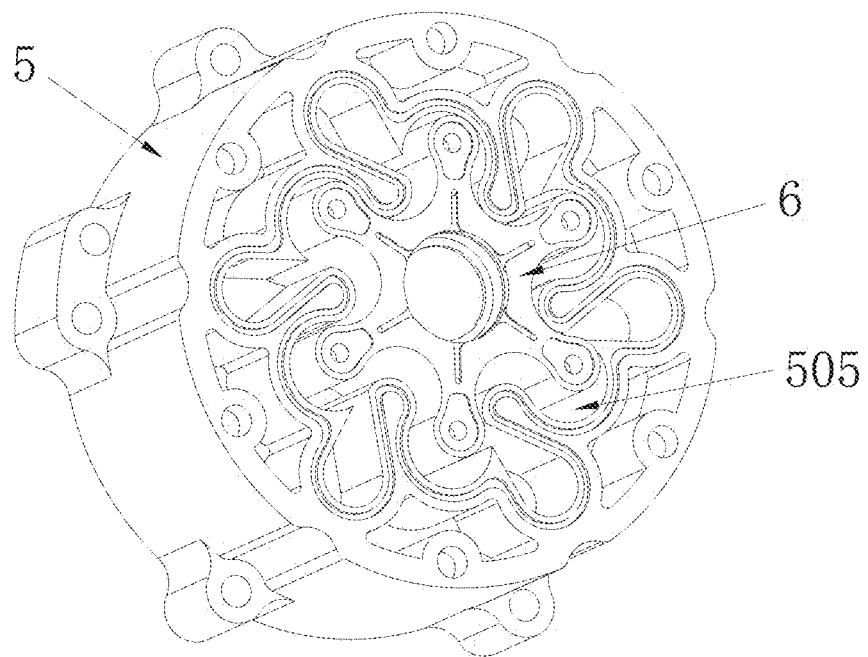
FIG. 6 is a schematic view of the rotor and the motor being assembled to each other, according to an embodiment of the present disclosure.
Figure 7:
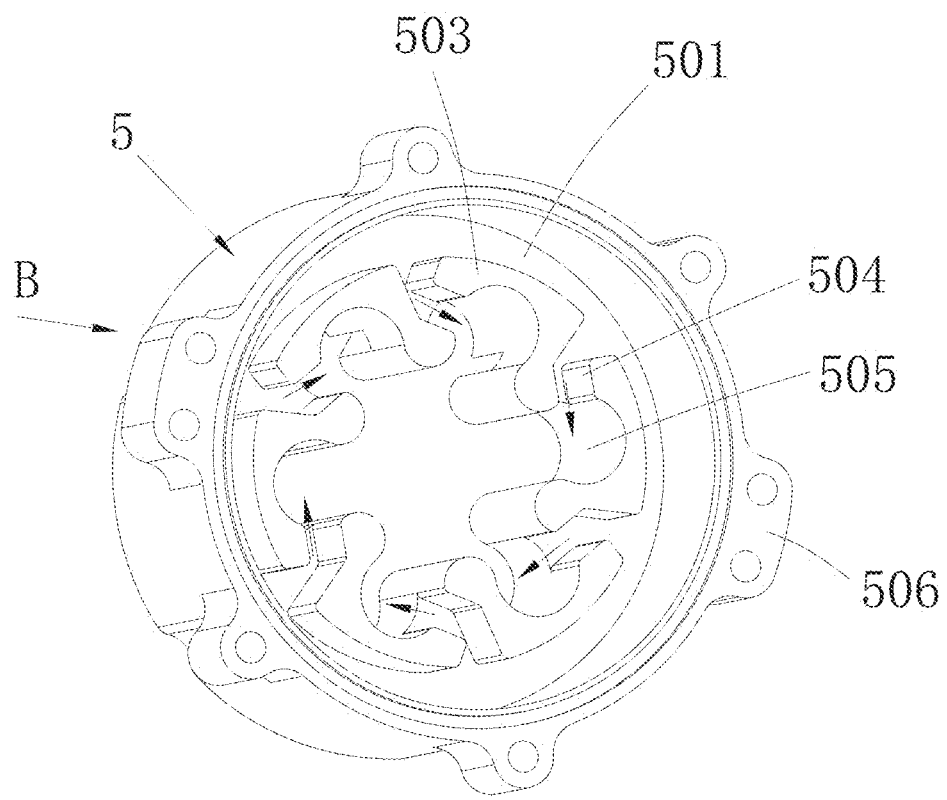
FIG. 7 is a perspective view of the stator according to an embodiment of the present disclosure.
Figure 8:
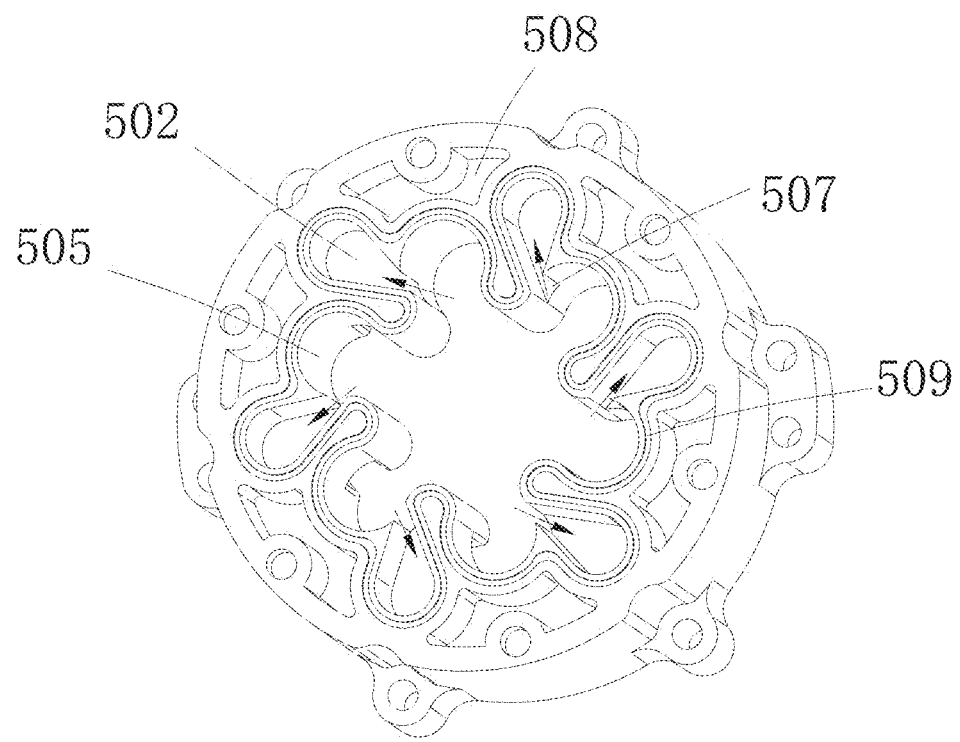
FIG. 8 is a perspective view of the stator shown in FIG. 7, being viewed from a direction B.
Figure 9:
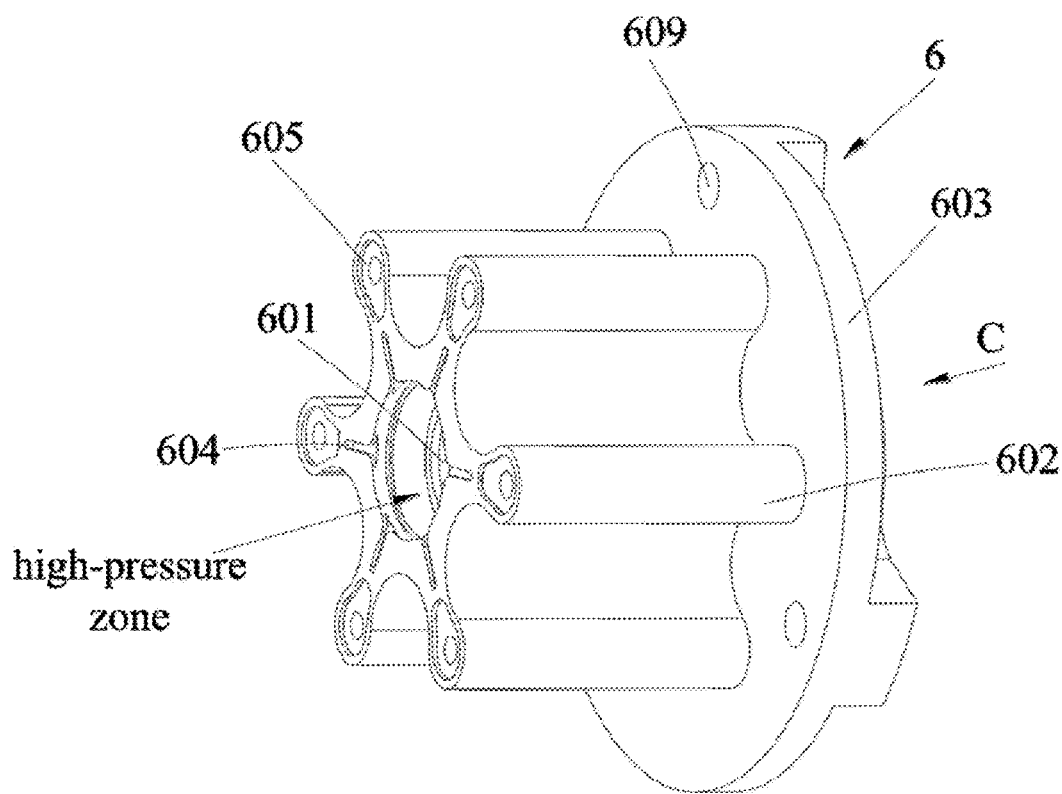
FIG. 9 is a perspective view of the rotor according to an embodiment of the present disclosure.
Figure 10:
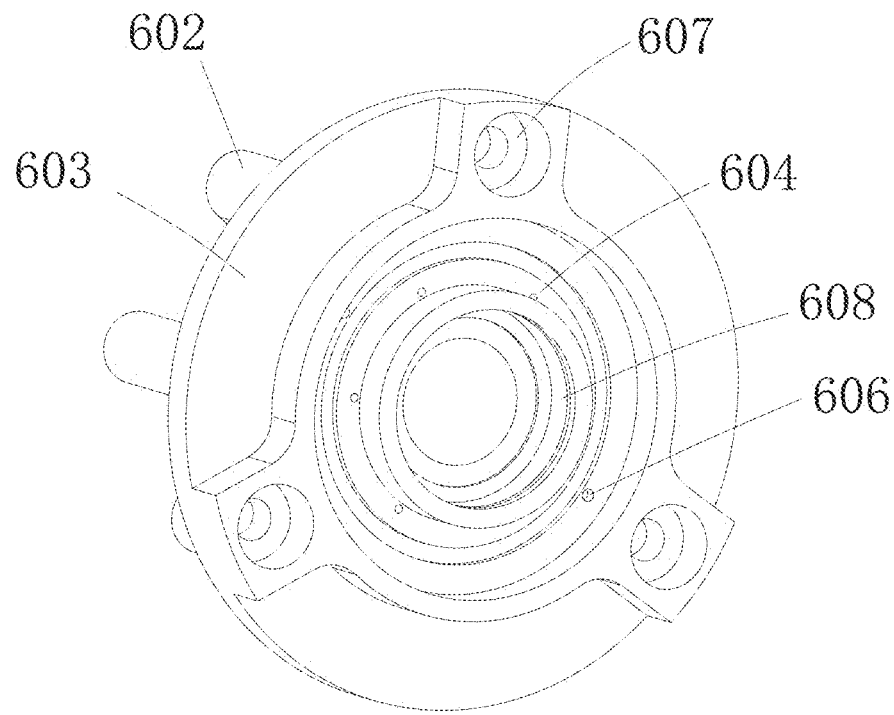
FIG. 10 is a perspective view of the rotor shown in FIG. 9, being viewed from a direction C.
Figure 11:
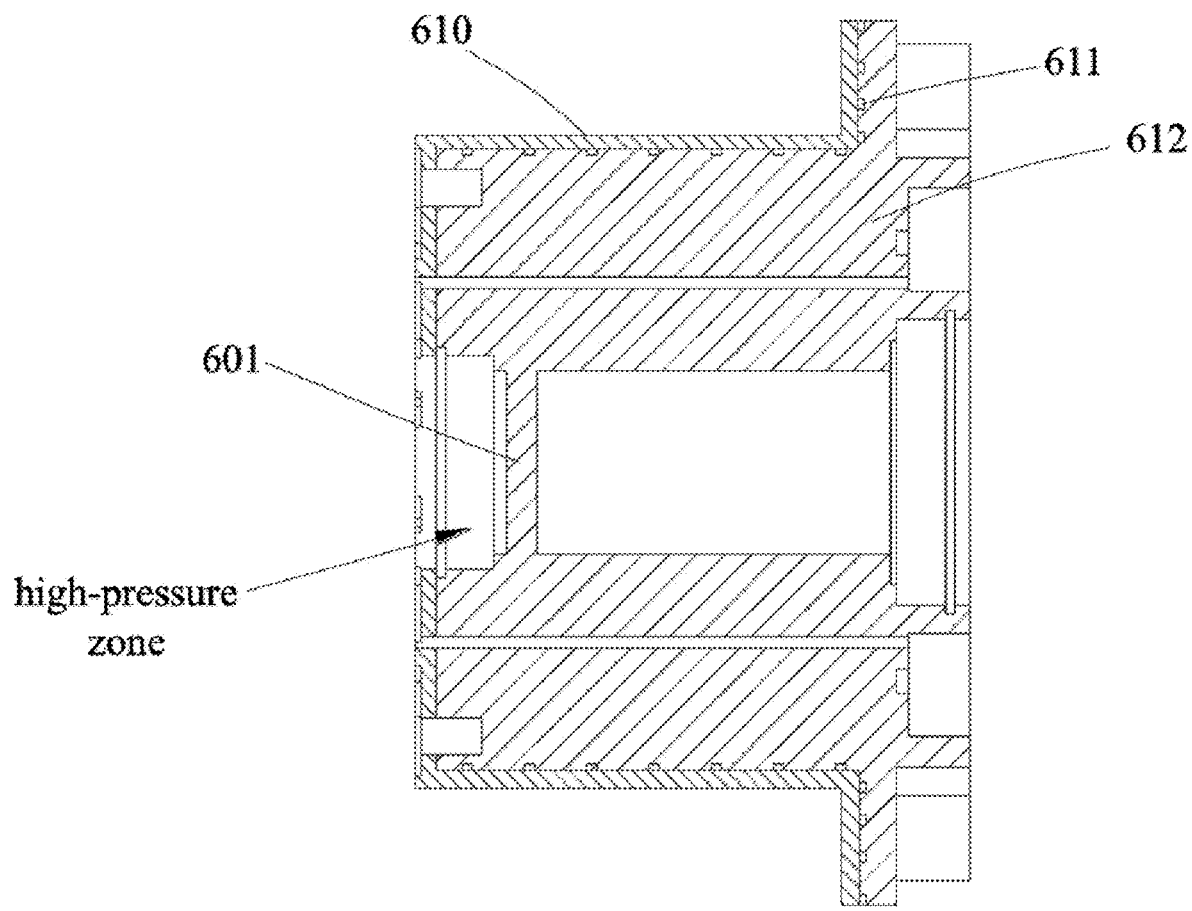
FIG. 11 is a cross-sectional view of the rotor according to an embodiment of the present disclosure.

As shown in FIGS. 1 to 11, the club-shaped liquid pump in the present disclosure includes a motor 3, an inlet end cover 2, and an outlet end cover 1. The motor 3 is arranged with a motor shaft 11. A base 4 is mounted at a bottom of the motor 3. The inlet end cover 2 and the outlet end cover 1 are both connected to the motor 3. The inlet end cover 2 is arranged with an inlet tube 201, and the outlet end cover 1 is arranged with and an outlet tube 101. The inlet tube 201 is configured to allow liquid to be input into the liquid pump. The outlet tube 101 is configured to allow the liquid to be discharged out of the liquid pump. One or more inlet tubes 201 and one or more the outlet tubes 101 may be arranged according to the actual demands.

A bracket 10 is connected to a side of the motor 3 near the outlet end cover 1. The bracket 10 defines an inlet hole 1001 through which the liquid is sucked into a stator 5. In the present disclosure, three arc-shaped inlet holes 1001 are defined and are distributed in a ring shape on the bracket 10. In this way, an efficiency of transferring the liquid is improved. The bracket 10 is fixedly arranged with a pump cover plate 7 through the stator 5. The pump cover plate 7 defines an outputting channel 702. The pump cover plate 7 is connected to a spring cover plate 8. The spring cover plate 8 defines an outputting hole 801 communicated with the outputting channel 702. A shut-off valve 701 is arranged in the outputting channel 702. The shut-off valve 701 abuts against the spring cover plate 8 by a spring 703. The spring 703 is configured to pre-tighten the shut-off valve 701, such that the liquid is slowly discharged through the shut-off valve 701. The pump cover plate 7 is connected to a rotor 6 via an eccentric connection shaft 9. The eccentric connection shaft 9 is connected to the pump cover plate 7 and the rotor 6 respectively via a bearing. The rotor 6 is connected to a motor shaft 11. The rotor 6 is connected to the bracket 10 via a pushing mechanism and at least two support mechanisms and rotates eccentrically along an interior of the stator 5.

The at least two support mechanisms are distributed in a ring shape between the rotor 6 and the bracket 10. The at least two support mechanisms are limited and supported to each other by fixation rings 1404. In the present embodiment, three support mechanisms are arranged and are distributed in the ring shape, such that the rotor 6 is mounted more stably and reliably. The fixation rings 1404 are configured to improve stability and reliability of the mounting of the support mechanisms and to ensure the at least two support mechanisms to rotate synchronously. The support mechanisms improve stability of the connection between the rotor 6 and the bracket 10 and ensure the rotor 6 to stably perform eccentric movements. Each support mechanism includes an eccentric block 1401, an engineering plastic ring 1402, and an anti-rotation pin 1403. The eccentric block 1401 is connected to an eccentric hole 1002 in the bracket 10. The eccentric block 1401 is connected to the eccentric hole 1002 through a bearing. The engineering plastic ring 1402 is connected to a positioning hole 607 in the rotor 6. The positioning hole 607 is communicated with a through hole 609. In the present embodiment, three annular positioning holes 607 and three through holes 609 are defined and are distributed in a ring shape. A side of the through hole 609 near the positioning hole 607 has a chamfer. The anti-rotation pin 1403 is connected to the fixation ring 1404 through a bearing. The anti-rotation pin 1403 is arranged with a step 1405. The eccentric block 1401 is connected to the step 1405. The anti-rotation pin 1403 extends through the engineering plastic ring 1402 and is connected to the through hole 609. The anti-rotation pin 1403 improves stability and reliability of the rotor 6 when the rotor 6 is rotating. The chamfer enables the anti-rotation pin 1403 to be inserted into the through hole 609 easily, and the anti-rotation pin 1403 is connected to the through hole 609 in an interference-fit manner or in a transition-fit manner. The step 1405 enables the anti-rotation pin 1403 to abut against the eccentric block 1401 to improve stability of the connection.

The pushing mechanism includes a piston ring 1501, a gasket spring 1502, and a positioning pin 1504. The rotor 6 defines an annular slot and a pin hole 606. One end of the positioning pin 1504 is connected to the pin hole 606, and the other end of the positioning pin 1504 is connected to the piston ring 1501. The gasket spring 1502 is disposed between the piston ring 1501 and the annular slot. An end face of the piston ring 1501 abuts against the gasket 10. The annular slot enables the gasket spring 1502 to be mounted and prevents the gasket spring 1502 from slipping. The positioning pin 1504 ensures the piston ring 1501 to move in an axial direction and tensions the rotor 6 through the gasket spring 1502, such that a friction between the rotor 6 and an inner wall of the stator 5 is reduced. The piston ring 1501 is connected to the rotor 6 by an O-shaped ring 1503.

At least one continuously-varying compression chamber 505 is defined between the rotor 6 and the stator 5. In the present embodiment, six compression chambers 505 are defined. The stator 5 is arranged with a tab plate 506 on an outer circumferential side of the stator 5. The tab plate 506 is connected to the bracket 10 by fastening screws and pins.

The rotor 6 includes a turning disk 603 and a rotation portion 602. The rotation portion 602 is club shaped and is fixed to the turning disk 603. The turning disk 603 defines a bearing hole 608. The bearing hole 608 is connected to the support shaft 12 through the bearing. The support shaft 12 is eccentrically connected to the motor shaft 11. The motor shaft 11 is connected to the bracket 10 through the bearing. The motor shaft 11 is arranged with a counterweight block 13. A block 601 is arranged in the rotation portion 602. A high-pressure zone is formed at an end of the rotation portion 602. The eccentric connection shaft 9 is connected to the high-pressure zone through a bearing. The support shaft 12 improves stability of the connection between the motor shaft 11 and the rotor 6, and the support shaft 12 and the eccentric connection shaft 9 cooperatively ensure the rotor 6 to rotate stably. The block 601 divides an interior of the rotation portion 602, such that balanced forces are applied to two ends of the rotor 6, and friction and wear may be reduced.

The rotation portion 602 defines at least one guiding hole 604 and at least one concave hole 605. The guiding hole 604 is communicated with the high-pressure zone and the annular slot. The concave hole 605 is defined in the end of the rotation portion 602 to reduce the wear of the rotor 6 when the rotor 6 is rotating. A pressure in the high-pressure zone may be guided to the annular slot through the guiding hole 604, and in combination with the pushing mechanism, balanced forces are applied to the rotor 6. The concave hole 605 is configured to store lubricant to further reduce friction and wear. In the present embodiment, six guiding holes 604 are defined, and each of the six guiding holes 604 is communicated with the annular slot.

Each of the turning disk 603 and the rotation portion 602 includes a metal body 612 and an engineering plastic layer 610. A thickness of the engineering plastic layer 610 is 2 mm to 4 mm. Each of an end surface of the turning disk 603 near the rotation portion 602 and an outer surface of the rotation portion 602 defines a channel 611. The engineering plastic layer 610 is connected to the metal body 612 via the channel 611. By defining the channel 611, the engineering plastic layer 610 is wrapped in surfaces of the turning disk 603 and the rotation portion 602, such that the engineering plastic layer 610 may not fall off easily, and the service life of the rotor 6 is extended. The metal body 612 may be made of aluminum alloy, ensuring the strength of the entire rotor 6.

Each of the engineering plastic ring 1402 and the engineering plastic layer 610 is made of elastic material. The elastic material may be rubber, polyether ether ketone (peek), and so on. The polyether ether ketone (peek) is not conductive and has high affinity. Even when the polyether ether ketone (peek) is worn down, debris of the polyether ether ketone (peek) may not cause damage to the motor 3. In addition, dry operation may be performed. In the cooling system, the refrigerant may be easily evaporate to generate a gas, and the gas may perform dry operation, such that demands of the dry operation are satisfied.

The stator 5 defines an inlet channel 501 and outlet channel 502 at two ends, respectively. In the inlet channel 501, protrusions 503 are arranged to form a club shape. A first guiding channel 504 is formed between two adjacent protrusions 503. The inlet channel 501 is communicated, through the first guiding channel 504, with the compression chamber 505. A plurality of outlet channels 502 are arranged to form the club shaped and is communicated, through the second guiding channel 507, with the compression chamber 505. In this way, the liquid flows from the inlet channel 501, passing through the first guiding channel 504, to enter the compression chamber 505. The liquid is compressed by the rotor 6 and the stator 5 and then flows through the second guiding channel 507 to be discharged out from the plurality of outlet channels 502. An end face of the stator 5 near the outlet channels 502 defines a weight-reduction chamber 508 and a sealing slot 509. Weight-reduction holes are distributed in an annular shape. The sealing slot 509 forms a sealing structure along the outlet channel 502 and the end face of the compression chamber 505. The weight-reduction holes may greatly reduce a weight of the stator 5 to further reduce a weight of the liquid pump. A sealing ring may be mounted in the sealing slot 509.

The motor 3 drives the motor shaft 11 to rotate to enable the liquid to enter the inlet end cover 2 through the inlet tube 201. Furthermore, the motor 3 enables the liquid to be sucked into the compression chamber 505 between the rotor 6 and the stator 5 through the inlet hole 1001. After continuous compression, the liquid is discharged by flowing through the outlet channel 702 and the outlet tube 101 arranged on the outlet end cover 1.

According to the above configuration, the rotor 6 and the stator 5 do not contact each other, a linear velocity of the rotor and the stator is significantly low. Therefore, wear and tear may not be caused. In addition, the rotor and the stator may operate in the oil-free state. Reliability of the liquid pump is improved, the service life of the liquid pump is extended, ensuring the cooling system to operate stably and reliably.

In the present embodiment, the bearings may be made of ceramic.

In practice, both the inlet tube and the outlet tube are fluidly connected to the cooling system, power is supplied, and then the motor is started. In this way, the liquid is enabled to enter the inlet end cover through the inlet tube and then enter the compression chamber by flowing along the motor via the inlet hole defined in the bracket. After being compressed, the liquid is discharged, by the shut-off valve, from the outlet end cover and the outlet tube to enter the cooling system.

The above description show only specific embodiments of the present disclosure, but technical features of the present disclosure are not limited thereto. Any simple changes, equivalent substitutions or modifications made based on the present disclosure to achieve essentially the same technical effects are covered by the scope of the present disclosure.

What is claimed is:

1. A club-shaped liquid pump, comprising:
a motor, arranged with a motor shaft;
an inlet end cover and an outlet end cover, wherein, the inlet end cover and the outlet end cover are both connected to the motor, the inlet end cover is arranged with an inlet tube, the outlet end cover is arranged with and an outlet tube;
a bracket, connected to a side of the motor near the outlet end cover, wherein, the bracket defines an inlet hole through which a liquid is sucked into a stator and fixedly arranged with a pump cover plate through the stator; the pump cover plate defines an outputting channel; the pump cover plate is connected to a rotor via an eccentric connection shaft; the rotor is connected to the motor shaft; the rotor is connected to the bracket via a pushing mechanism and at least two support mechanisms and is configured to rotate eccentrically along an interior of the stator; at least one continuously-varying compression chamber is defined between the rotor and the stator;
wherein, the rotor comprises a turning disk and a rotation portion, the rotation portion is club shaped and is fixed to the turning disk;
two ends of the stator defines an inlet channel and a plurality of outlet channels, respectively; in the inlet channel, a plurality of protrusions are arranged to form a club shape; a first guiding channel is formed between two adjacent protrusions of the plurality of protrusions; the inlet channel is communicated, through the first guiding channel, with the compression chamber; the plurality of outlet channels are arranged to form the club shaped and are communicated, through a second guiding channel, with the compression chamber;

the motor is configured to drive the motor shaft to rotate to enable the liquid to enter the inlet end cover through the inlet tube and to be sucked into the compression chamber between the rotor and the stator through the inlet hole; after continuous compression, the liquid is discharged from the outlet tube arranged on the outlet end cover by flowing through the outputting channel.

2. The club-shaped liquid pump according to claim 1, wherein, the at least two support mechanisms are distributed in a ring shape between the rotor and the bracket; every two of the at least two support mechanisms are limited and supported to each other by a fixation ring.

3. The club-shaped liquid pump according to claim 2, wherein, each support mechanism comprises an eccentric block, an engineering plastic ring, and an anti-rotation pin; the eccentric block is connected to an interior of an eccentric hole defined in the bracket; the engineering plastic ring is connected to an interior of a positioning hole defined in the rotor, the positioning hole is communicated with a through hole; a side of the through hole near the positioning hole has a chamfer, the anti-rotation pin is connected to the fixation ring, the anti-rotation pin is arranged with a step, the eccentric block is connected to the step, the anti-rotation pin extends through the engineering plastic ring and is connected to the through hole.

4. The club-shaped liquid pump according to claim 3, wherein, the pushing mechanism comprises a piston ring, a gasket spring, and a positioning pin; the rotor defines an annular slot and a pin hole; one end of the positioning pin is connected to the pin hole, and the other end of the positioning pin is connected to the piston ring; the gasket spring is disposed between the piston ring and the annular slot; an end face of the piston ring abuts against the gasket.

5. The club-shaped liquid pump according to claim 4, wherein, the turning disk defines a bearing hole; the bearing hole is connected to a support shaft through a bearing; the support shaft is eccentrically connected to the motor shaft; a block is arranged in the rotation portion; a high-pressure zone is formed at an end of the rotation portion; the eccentric connection shaft is connected to the high-pressure zone through a bearing.

6. The club-shaped liquid pump according to claim 5, wherein, the rotation portion defines at least one guiding hole and at least one concave hole; the at least one guiding hole is communicated with the high-pressure zone and the annular slot; the concave hole is defined in an end of the rotation portion.

7. The club-shaped liquid pump according to claim 5, wherein, each of the turning disk and the rotation portion comprises a metal body and an engineering plastic layer; a thickness of the engineering plastic layer is 2 mm to 4 mm; each of an end surface of the turning disk near the rotation portion and an outer surface of the rotation portion defines a channel; the engineering plastic layer is connected to the metal body via the channel.

8. The club-shaped liquid pump according to claim 7, wherein, each of the engineering plastic ring and the engineering plastic layer is made of elastic material.

9. The club-shaped liquid pump according to claim 1, wherein, an end face of the stator near the outlet channels defines a weight-reduction chamber and a sealing slot; weight-reduction holes are distributed in an annular shape; the sealing slot forms a sealing structure along the outlet channels and the end face of the compression chamber.

10. The club-shaped liquid pump according to claim 1, wherein, the pump cover plate is connected to a spring cover plate; the spring cover plate defines an outputting hole communicated with the outputting channel; a shut-off valve is arranged in the outputting channel; the shut-off valve abuts against the spring cover plate by a spring.

* * * * *